F. ECAUBERT.
FLEXIBLE SHAFTING.
APPLICATION FILED FEB. 8, 1916.
1,281,918. Patented Oct. 15, 1918.
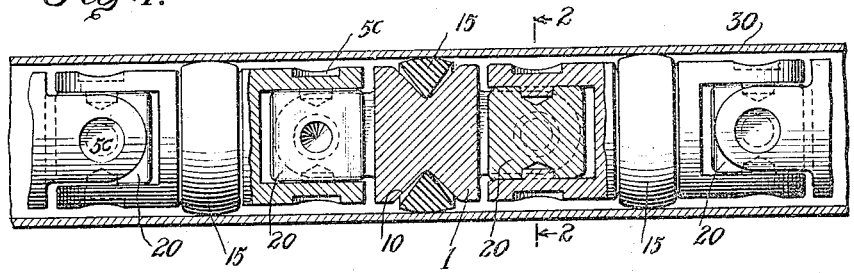
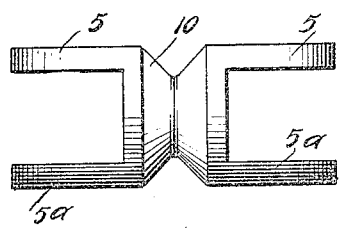
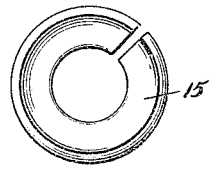
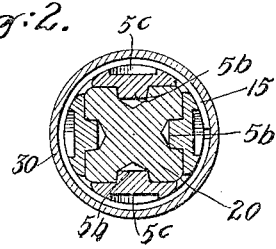
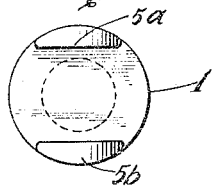
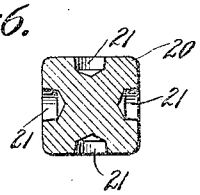
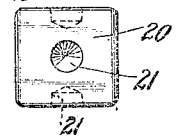
Frederic Ecaubert Inventor,
By his Attorneys

UNITED STATES PATENT OFFICE.

FREDERIC ECAUBERT, OF BROOKLYN, NEW YORK.

FLEXIBLE SHAFTING.

1,281,918.  Specification of Letters Patent.  Patented Oct. 15, 1918.

Application filed February 8, 1916. Serial No. 76,944.

*To all whom it may concern:*

Be it known that I, FREDERIC ECAUBERT, a citizen of the United States, residing in Brooklyn, in the county of Kings and State of New York, have invented certain new and useful Improvements in Flexible Shafting, of which the following is a full and clear specification.

The present invention relates to improvements in flexible shafting for transmitting power and particularly to the type of such shafting adapted for small and delicate work, such as the flexible shafting used for dental engines and other forms of drilling machines for fine work. The purpose of the present invention is to produce a simple, strong and effective form of flexible shafting which will be accurate in construction and operation with a minimum of lost motion in the articulated joints of the shaft sections, and which will lend itself readily to economical manufacture by automatic machinery.

To this end my improved flexible shafting comprises a plurality of link members formed at their opposite ends with spaced parallel arms, and coupling block members straddled by the arms of the link members and pivoted thereto preferably by means of integral lugs formed from the material of the arms, pressed into conical recesses in the faces of the coupling blocks. Adjacent spaced arms of adjoining links are arranged in longitudinal planes at right angles to each other. The bearing recesses of the coupling blocks extend diametrically into each block from the four faces that are presented longitudinally of the shaft. These recesses are preferably conical in form with their side walls tapered slightly from the perpendicular. The links and blocks are readily formed from stock material by automatic punching machinery and the parts assembled into flexible shaft form by an automatic die press. The inner faces of the arms, as well as the integral lugs bear upon the coupling blocks, and to produce sufficient freedom of movement between the links and blocks the material of the arms may be compressed slightly between their side edges to relieve the arms and lugs from a too close engagement with the coupling blocks.

In order that the invention may be fully understood I will first describe the same with reference to the accompanying drawing and afterward point out the novelty more particularly in the annexed claims.

In said drawing,—

Figure 1 is a side elevation, partly in section, of a piece of flexible shafting embodying my invention;

Fig. 2 is a transverse sectional view of the same, taken on the line 2—2, of Fig. 1;

Fig. 3 is an enlarged detail side elevation of one of the link members of the shaft;

Fig. 4 is an end view of the same;

Fig. 5 is a face view of a bearing ring which encircles and supports the link members of the shaft;

Fig. 6 is a transverse sectional view of a power transmitting block member;

Fig. 7 is a side elevation of the same.

My improved flexible shaft is made up of a plurality of peculiarly shaped link members coupled together by interposed power transmitting blocks, which are engaged by and pivotally connected with the link members.

Each link member consists of a body portion 1 having oppositely projecting pairs of integral arms 5, 5ª which extend longitudinally of the body portion 1. The arms 5, 5ª of each pair are parallel with each other, and have their ends cut away or rounded for proper clearance. The link is preferably made from cylindrical stock by proper automatic machinery, which cuts off the required length of stock and removes the material at the ends to form the arms 5, 5ª. Each link 1 is provided with a central annular bearing groove 10, for the reception of a split bearing ring 15 of approximately triangular transverse cross section. The bearing rings 15 are of split formation to facilitate mounting them upon the link members.

20 is a power transmitting coupling block of approximately cubical form having in its four longitudinal faces the diametrical bearing recesses 21. The recesses 21 have their walls tapered slightly with respect to the minor diameters of the cubical block. The power transmitting blocks 20 are conveniently formed from rectangular stock by automatic machinery, the cubical block being cut from stock and the bearing recesses 21 stamped therein by means well understood in the art.

In forming the flexible shafting of the link elements 1 and block elements 20, a block is placed between a pair of arms 5, 5ª and while held by proper mechanism in the automatic machine the opposite faces of the arms 5, 5ª are subjected to die pressure by dies of greater cross section than the cross sectional area of the bearing recesses, with the result that the metal of the arms is displaced and forced into the bearing recesses in the form of integral lugs indicated at 5ᵇ. The impressions made by the dies are shown at 5ᶜ. In forming the integral bearing lugs 5ᵇ it is important that the metal spreading dies be of greater cross sections than the bearing recesses of the blocks, so as to avoid the possibility of shearing the metal of the arms. In this operation it will be understood that the recesses of the coupling blocks act as female dies in the formation of the integral bearing lugs.

The inner faces of the arms 5, 5ª bear upon the opposite faces of a coupling block 20 while the integral lugs formed in said arms will bear in the recesses 21 and pivotally connect the arms with the coupling blocks. The arms 5, 5ª are then compressed slightly between their side edges to slightly raise the lugs 5ᵇ from the bearing recesses of the blocks and afford sufficient clearance between the block and side arms to permit relative movement upon the pivoted lugs.

The adjoining link member is then secured to the coupled block 20 by straddling arms 5, 5ª upon the exposed lateral faces of block 20 between the arms of the already attached member and the same process of forming pivot lugs by spreading the metal of the arms 5, 5ª of said second link member, is performed. The adjacent arms of adjoining link members straddle a common power transmitting block by engaging the faces of the block in longitudinal planes at right angles to each other.

Each link member 1 is supported in a bearing ring 15 above referred to, and surrounding the shafting I may employ a flexible casing indicated at 30. This casing 30 will rest upon the bearing rings 15 which hold the casing away from the rotating parts of the flexible shaft. The flexible shaft may be considered as rotating in the bearing rings 15 which remain stationary while the shaft rotates.

In this manner a flexible shaft of any desired length can be built up. The manufacture of such shafting will be found to be relatively cheap because the operations of forming the link and block members of the shaft, as well as of assembling the parts can be performed by simple automatic machinery. The resulting flexible shafting can be made with little or no backlash or lost motion, so that it can be used for transmitting power in the most delicate drilling operations. The form of the flexible shaft lends itself to the production of shafting of very small diameters. The coupling block between the link members transmits the power from one link member to the next, the arms of the link members engaging the faces of the coupling blocks for transmitting the power while the pivotal connection between the link members and blocks permit the flexure of the shaft in any desired direction.

The lugs 5ᵇ produced according to the process above described are circular in cross section and their sides are approximately parallel, that is to say, their imaginary extensions inwardly toward the axis of rotation of the shaft would not meet until some point beyond the geometrical axis of the shaft. Due to this fact, the turning force does not have a tendency to force the lugs outward, so that, in effect, these lugs constitute positive locks up to their shearing strength. The important advantage in this construction resides in the fact that no assembly screws or other members are required to hold the parts in their proper relation and hence the recognized disadvantage in flexible shafts heretofore produced, namely, the working loose of the parts, is entirely avoided.

I claim:

1. A flexible shaft consisting of a plurality of single piece link members and recessed power transmitting block members interposed between the link members, each link member being formed of a single integral piece of metal having at its opposite ends a pair of spaced longitudinally extending inflexible arms which straddle and have bearing upon a block member, said arms having integral lug portions upon their inner faces pressed from said arms into the recesses of the blocks to form pivotal connections therewith.

2. A flexible shaft consisting of a plurality of single piece link members and recessed power transmitting block members interposed between the link members, each link member being formed of a single integral piece of metal having at its opposite ends a pair of spaced longitudinal extending inflexible arms which straddle and have bearing upon a block member, said block members being formed with conical recesses in opposite faces and said arms having integral lug portions upon their inner faces pressed from said arms into said conical recesses to form pivotal connections between said arms and said blocks.

3. An articulated flexible shaft comprising a plurality of link members and interposed coupling block members, the adjacent ends of adjoining link members being pivoted to the coupling blocks at right angles to each other, the link members having annular grooves of angular cross-section, bearing rings having inner bearing faces of angular profile loosely seated in said annular grooves, and a flexible covering inclosing the shaft and supported upon said rings out of contact with said shaft.

4. An articulated flexible shaft comprising in combination a plurality of one-piece link members, each having at its opposite ends a pair of spaced-apart longitudinally extending inflexible arms, and a power transmitting block member straddled by the arms of two adjacent link members, said block members having recesses in the sides engaged by said arms and said arms having integral lugs projecting into said recesses, the recesses and lugs being shaped to constitute positive locks under twisting strain up to the shearing strength of the lugs.

5. An articulated flexible shaft comprising in combination a plurality of one-piece link members, each having at its opposite ends a pair of spaced-apart longitudinally extending inflexible arms, and a power transmitting block member straddled by the arms of said adjacent link members, said block members having recesses in the sides engaged by said arms and said arms having integral lugs projecting into said recesses, the lugs and recesses being circular in cross section and having sides whose imaginary extensions inward intersect at a point beyond the geometrical axis of the shaft.

FREDERIC ECAUBERT.

Copies of this patent may be obtained for five cents each, by addressing the "Commissioner of Patents, Washington, D. C."